United States Patent [19]

Allen

[11] Patent Number: 4,943,931

[45] Date of Patent: Jul. 24, 1990

[54] DIGITAL ARTIFICIAL NEURAL PROCESSOR

[75] Inventor: Reginald A. Allen, Vista, Calif.

[73] Assignee: TRW Inc., Redondo Beach, Calif.

[21] Appl. No.: 189,438

[22] Filed: May 2, 1988

[51] Int. Cl.$^5$ .............................................. G06F 15/18
[52] U.S. Cl. ..................................... 364/513; 364/200; 364/274; 364/276.5; 364/276.7
[58] Field of Search ... 364/200 MS File, 900 MS File, 364/513; 307/201

[56] References Cited

U.S. PATENT DOCUMENTS

| | | | |
|---|---|---|---|
| 3,484,749 | 12/1969 | Andreae et al. | 364/900 |
| 3,533,072 | 10/1970 | Clapper | 364/900 |
| 3,566,359 | 2/1971 | Connelly | 364/900 |
| 3,613,084 | 10/1971 | Armstrong | 364/900 |
| 3,725,875 | 4/1973 | Choate et al. | 364/200 |
| 4,254,474 | 3/1981 | Cooper et al. | 364/900 |
| 4,518,866 | 5/1985 | Clymer | 364/900 X |

Primary Examiner—Gareth D. Shaw
Assistant Examiner—Paul Kulik
Attorney, Agent, or Firm—Ronald M. Goldman; Benjamin DeWitt

[57] ABSTRACT

An artificial neural system employs digital elements that may be fabricated using state of the art technology. The system includes a plurality of digital neural processors, each of the processors containing at least one register for storing a number; a signal is applied to the register to selectively increment or decrement the number stored in the register; circuitry is provided for resetting the register and for processing the number stored in the register. The neural system is trained by incrementing and/or decrementing numbers stored in the registers.

6 Claims, 1 Drawing Sheet

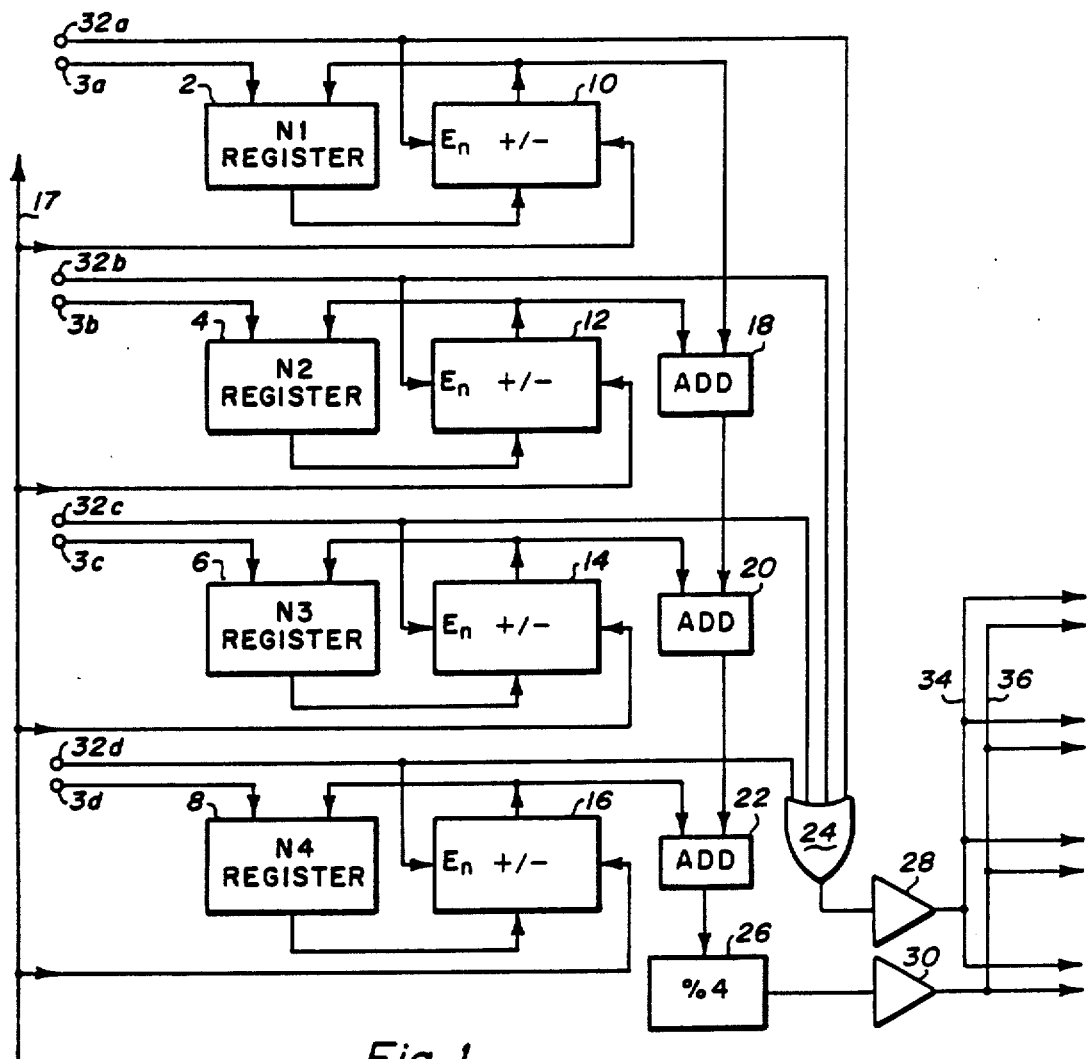
Fig_1
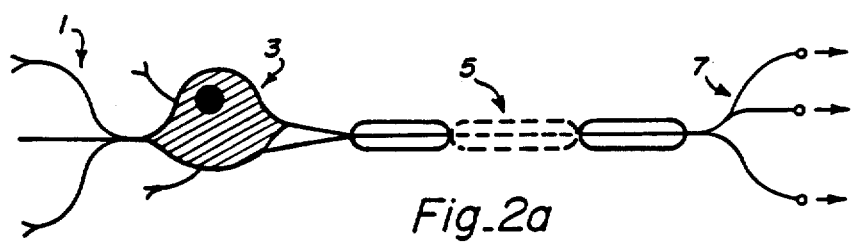
Fig_2a
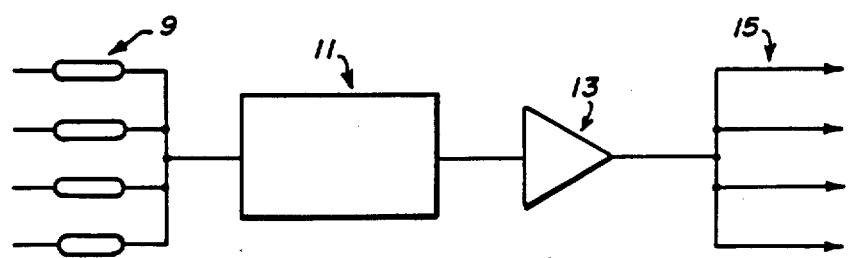
Fig_2b

DIGITAL ARTIFICIAL NEURAL PROCESSOR

FIELD OF THE INVENTION

This invention relates to artificial neurons and, more particularly, to digital processors intended to simulate the function of a human neural system.

BACKGROUND

Artificial intelligence is perhaps a "catch all" phrase that grasps within its meaning the concept of a man made machine that thinks, learns, reasons and answers or acts much like a human being or other animal in responding to external stimuli. In effect, this artificial intelligence is the engineer's attempt to at least in part mimic the capability of the human brain. The development of the high speed large memory low cost electronic digital computer, which makes use of micro miniaturized electronic components, permits design of electronic systems that in the general sense mimics a small part of the human brain. For example, computer programs exist that performs calculations, such as by multiplying two numbers and displaying the correct results, just as one would do by rules set in the mind. The computer, however, is quicker and usually more accurate. In reality the computer is not thinking in the normal sense of the word. It is merely performing a set of additions according to a rule or plan which the computer and/or software designer has installed. Thus by reason of that program, one is always assured of a correct result in something simple, such as a calculation, and the power of those modern computers lies in its speed and ability to handle large quantities of numbers quickly. Despite the size and speed of computers, the engineering world concedes that the largest computer today cannot perform the same reasoning and is not equal in ability to the human mind. The difference between designing a circuit or program so that it always produces a correct or best result for a given problem and the manner in which the human mind operates has been recognized by John Hopfield of the California Institute of Technology as reported in the Electronics Engineering Times dated Apr. 7, 1986, pages 53 and 62, 63. Hopfield reasoned that overall behavior, in a particular computation, may be a collective effect of having a vast number of nerve cells, rather than as a biological design objective. A human's mechanical, spectral, thermal, chemical and energy inputs are made to the many thousands of nerve endings, called the dendritic tree, which are attached to the soma and are outputted through axons to axon terminals. The theory is that the group of biological neurons interact and through a process, not exactly understood but theorized, learns. This learning is in some way stored within the vast bundle of nerves.

The neuron consists of several distinct portions, the dendritic tree consisting of a system of branching dendrites from many synapses; the body of the neuron, the soma; and the axon system. Energy or information arrives at one or more of the dendritic inputs and during the transition through the neuron the amount of energy is modified by excitatory or inhibitory post-synaptic potentials.

Researchers in this field reported at the second annual Neural Circuits for Computing Conference, 16–17 April 1986 and reported in Electronic Engineering Times, dated Apr. 21, 1986 on page 14, to use variable resistances to simulate and serve as the synaptic connections. As the response to the excitatory or inhibitory post-synaptic potentials, this method modifies the energy in an analog manner. According to the published literature, researchers at the California Institute of Technology (1984) provide programmable interconnections to emulate positive and negative resistance. Other researchers at AT&T Laboratories use an iron beam to create variable resistors. They grow resistors from amorphous silicons sandwiched between two layers of tungsten. Researchers at MIT vary the threshold of metal nitride oxide semiconductors to control the number of electrons in a packet of charge.

According to Hopfield's theory, Hopfield, J. J., "Neural networks and physical systems with emergent collective computational abilities", Proc. Nat. Acad. Sci. USA 79, 2554–2558, April, 1982, the individual details of neuron behavior are less important than their collective effects. Neurons put out dendritic trees with between 1,000 and 10,000 branches each. "Feedback loops" also seemed significant. Neurons establish mutual connections with their neighbors and communicate with one another simultaneously. According to Hopfield "There seemed to be a high degree of mutual communication going on at a given level in a neural network".

In this first simulating structure, operational amplifiers were chosen to represent the neuron. A square matrix of wires with resistive links at intersections was chosen to represent the interconnection of neurons. Outputs from each amplifier were fed back to the inputs of all the other amplifiers by the interconnection matrix. Hopfield discovered that a symmetrical arrangement of resistances in the interconnection to reach a smooth, regular energy surface that could be used to predict the behavior of the circuit. When disturbed from an equilibrium point on the surface by placing voltages on input points, the circuit would slide down the energy surface to the nearest minimum. The circuit could be designed so that these minimal points define computational output in digital form and could be designed to accept either analog or digital inputs. According to the literature this kind of electronic circuit provides a good solution, but not always the best solution, and in that way better simulates a real life intelligence.

As the same literature reports the positive resistances are very difficult to build in silicons and negative resistances are virtually impossible.

The present invention achieves "feedback" between the block, simulating a neuron, digitally. An advantage is that the digital form of artificial neuron may be fabricated using existing very large scale integrated circuit technology, without the need for new process development of the kind reported in the literature. A further advantage is that a fully implemented artificial neural system containing several hundred neuron elements and several thousand interconnections can be produced on a single VLSI chip. The values of the synaptic connections can readily be increased or decreased; whereas the variable resistance approach reported in the Electronic Engineering Times, Apr. 21, 1986, page 14 and at the second annual Neural Circuits for Computing Conference, 16–17 April 1986 is difficult. A further advantage of the present invention is that upon solving an artificial intelligence problem, the solution is stored in the simulated synaptic connection. That connection can be addressed in an identical manner to a semiconductor memory, then the pattern may be copied to other VLSI neuron systems without the need for the learning process.

An object of the invention is to provide an improved artificial neural system. A further object of the invention is to provide a design that simulates a neural system and that may be fabricated using any existing standard semiconductor or VLSI technology.

SUMMARY OF THE INVENTION

The digital artificial neuron according to the invention includes a plurality of "data" inputs, suitably four, a corresponding plurality of binary registers and a corresponding plurality of supplemental "buffer" registers. Numbers are input to the binary registers. A processor or like device adds the outputs of the four binary registers and divides the sum by four to output an average number. The output is coupled to an output buffer that drives inputs to several other like elemental digital artificial neurons. Each register is output through the buffer register that increments or decrements the number earlier inputted and the buffer register's output is coupled to the input of the associated binary register. A "flag" line over which to receive a control signal, the flag bit, is associated with each buffer register. And a feedback line is connected to the increment/decrement input of the buffer registers to input externally generated signals affecting the number in the buffer registers.

When any of the four data inputs in the system receives a new number, a flag bit is simultaneously applied over an associated flag line. The register is now active and the new number is received and stored in the register. With a new number in any one register the sum taken by the central processor is modified; and the output of the circuit is similarly modified. Should the output of the artificial neural system with which the circuit is associated tend toward a correct response, the artificial neural system generates an excitatory post synaptic potential that increases, i.e. rewards the numbers stored in the active register by incrementing the registers; hence a number is added over the feedback "line". Conversely should the output of the artificial neural system tend towards an incorrect response, the artificial neural system generates an inhibitory post synaptic potential that reduces, i.e. punishes the numbers stored in the active registers by decrementing the register and a negative number is added over the feedback "line". This number may be supplied to the feedback line by the operator who is training the artificial neural system. The operator adds a negative or positive pulse over the lines to signify disapproval or approval.

The foregoing and additional objects and advantages of the invention together with the structure characteristic thereof, which was only briefly summarized in the foregoing paragraphs, becomes more apparent to those skilled in the art upon reading the detailed description of a preferred embodiment of the invention, which follows in this specification, taken together with the illustration thereof presented in the accompanying drawings.

DESCRIPTION OF THE DRAWINGS

In the Drawings:

FIG. 1 illustrates the invention in block diagram form; and

FIGS. 2a and 2b illustrate a biological neuron and a corresponding digital artificial neural processor, respectively.

DETAILED DESCRIPTION OF THE PREFERRED EMBODIMENT

FIG. 1 illustrates in block diagram form a digital artificial neural processor according to the invention. The processor circuit includes a plurality, suitably four, of binary registers 2, 4, 6 and 8. A plurality, suitably four, of buffer registers 10, 12, 14 and 16, each of which is paired or associated with a binary register. Buffer register 10 is associated with binary register 2; buffer register 12 with binary register 4; register 14 with binary register 6 and register 16 with binary register 8.

Each binary register contains two inputs and an output. Binary register 2 has one input connected to a data input line 3a and a second input is connected to the output of buffer register 10. As shown by the flow line, a binary number is input at line 3a. The register records that number and outputs same to one input of buffer register 10, which in turn stores the number. That number is also output from the separate buffer registers and applied to both the second input of the associated binary register and to an input to "add" circuit 18, the latter of which as illustrated contains two inputs and an output. In like manner data input line 3b is connected to an input of register 4; data line 3c is connected to an input of register 6; and data input line 3d is connected to an input of register 8. Similarly the output of buffer register 12 is coupled to the second input of an add circuit 18. The sum output from add circuit 18 is applied to one of the inputs of a second add circuit 20. The output of buffer register 14 is coupled to the second input of that second add circuit and the sum formed at the output is applied to a third add circuit 22. The output of buffer register 16 is applied to the second input of that add circuit. The output of add circuit 22 thus is the sum of the numbers from the four buffer registers.

Flag bit inputs 32a, 32b, 32c and 32d are associated or paired with buffers 10, 12, 14 and 16, respectively. A flag bit input is coupled to the second input of an associated buffer register as well as to one of the inputs of an "or" gate 24. Flag input 32a is input to buffer 10; input 32b to buffer 12; input 32c to buffer 14 and 32d to buffer 16. The output of add circuit 22 is connected to the input of a divider circuit, which may be a shift register, that divides the sum supplied at an input to obtain an average at an output. Division by four is performed simply by moving the binary number in the shift register, two places towards the least significant bit. A buffer amplifier 28 outputs any flag bit received by any of the four buffer registers in the neural processor to the flag bit output circuit 34. A buffer amplifier 30 couples the output of divider 26 to the data output 36 of this neural processor circuit.

As illustrated to the left side of the figure, a data path is coupled to the second input of each of the binary registers 2, 4, 6, and 8. In operation data, specifically a binary number is applied to one or more of the registers via the associated "data in" terminal. Simultaneously a flag bit applied over at least the one circuit that receives an input number enables the operation of the associated buffer register, such as buffer register 10; and that flag bit also passes through the Or gate 24 and buffer 28 to like neural circuits, not illustrated, to the right of this elemental neural processor circuit; which form part of the neural system.

Considering the combination of register 2 and 10 by way of an example, the number applied and stored in register 2 is input through and stored within buffer register 10. The number stored in the buffer register is also output to the second input of register 2 in a feedback circuit arrangement so that the number is retained. The buffer register can increment or decrement the number so stored. If the input signal along feedback line 17 is of a first type, the number in the buffer register is decremented, decreased in value. Conversely, if the number on line 17 is of a second type, the register is incremented, increasing the size of the stored number. As incremented or decremented the new number is input to both the associated register, such as register 2 in connection with buffer register 10, and to add circuit 18.

Each of the three remaining binary register and buffer register combinations operate in a similar manner to provide an input to one of the inputs of an associated "add" circuit. The Add circuit output at Add circuit 22 represents the sum of all of the numbers outputted from buffer registers 10, 12, 14 and 16. The divider 26 divides that sum by a number equal to the number of register combinations in the elemental circuit, which in this example is four, so as to provide an average or weighted number. This number is output to all of the data outputs 36 indicated to the right of the figure.

Reference is made to FIG. 2a, which depicts a biological neuron. As is familiar to those in the medical profession the neuron contains the dendritic tree 1, the many thousands of nerve endings that receive mechanical, spectral, thermal and chemical energy; a soma 3, a central assembling element for the dendritic trees; an axon 5, a transmission channel that carries information from the soma; and axon terminals 7, which convert the transmitted information into chemical energy that perhaps is understood and given meaning by the human brain so that the person recognizes the senses, heat, light, touch and the like.

By analogy in the diagram of FIG. 2b the "dendritic trees" of the digital artificial neural processing element are the four input terminals 9, each of which is connected to a binary register, and associated registers. The central processor 11 represents the "soma", which corresponds to the divider or processor 26 of FIG. 1 that adds the output from the four registers and divides that sum by four. An output buffer 13, which the drives the input to several other digital artificial neural processing elements of like structure, corresponds to and represents the "axon system" of FIG. 2a. The output terminals 15 correspond to the axon terminals. Instead of a chemical output of the biological neuron, the amount of energy entering or leaving the artificial neuron is represented by a binary number. That number is stored in one of the four registers.

Reference is again made to FIG. 1. The "excitatory post synaptic potential" increases the value of the numbers in the buffer registers and the "inhibitory post synaptic potential" decreases the values of those numbers. The register size is equal to the number of bits in the input and output numbers. In the quiescent condition when the digital artificial neural processor is not receiving signals from other artificial neurons or from the external sources, the inputs are at half the maximum number that the register can hold. Since no action is required the input numbers are transmitted to the central processor unchanged. The central processor adds the output of the four registers together and divides that sum by four to provide an average. This outputted number is amplified by the buffer amplifier and transmitted to the next group of neural processing elements.

When any of the four inputs receives a new input number, it also receives, simultaneously, a flag bit. The register is now active and the new number is stored. A new number in any register modifies the sum in the central processor and hence the output of the neural circuit. Should the output of the neural circuit tend toward a correct response, the artificial neural system generates an excitatory post synaptic potential that is a signal of a first type that will increase, that is reward, the number stored in the active registers. Conversely should the output of the artificial neural system tend towards an incorrect response, the system generates an inhibitory post synaptic potential that is a signal of a second type that reduces, that is punishes, the numbers stored in the active registers.

The present invention serves as an element of a digital artificial Neural system. Combined with other like elements in an array is seen to provide a digital solution. As those skilled in the digital arts recognize, the elements are known and may be fabricated using existing technologies. Moreover, because the elements are digital they may be combined with additional digital circuits. Thus a digital processor may be combined with the circuit and arranged to poll or map the state and values in each of the digital neural processor elements and preserve or store that pattern in a digital memory. The contents of that memory may then be applied to other circuits and represents an "earned" solution.

It is believed that the foregoing description of the preferred embodiment of the invention is sufficient in detail to enable one skilled in the art to make and use the invention. However, it is expressly understood that the details of the elements which are presented for the foregoing enabling purpose is not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. In an artificial neural system containing a plurality of neural processors and means for generating digital numbers and flag bits, the improvement in which said neural processors each comprise:

a plurality of number receiving inputs for receiving numbers in binary form and a corresponding plurality of flag bit inputs for receiving flag bits, each of said number receiving inputs being associated with one of said flag bit inputs to permit a flat bit to be applied prior to supply of a number to the associated number input;

a feedback signal input;

a number output;

a flag bit output;

a plurality of pairs of registers forming register pairs, each said pair including a primary register for receiving and storing numbers inputted in binary form to an associated number input of the neural processor, and a buffer register;

each of said primary registers in said plurality having first and second register inputs and an output with said primary register storing the number last applied in time at either of said first or second register input;

said number receiving inputs being connected to an input of an associated one of said primary registers for applying a number appearing at the respective input to the associated primary register;

each said buffer register of said pairs of registers having first, second and third buffer register inputs and an output, said buffer register being responsive to a flag bit at one input for conditioning said buffer register to receive a new number, and being responsive to the binary number stored in the primary register in said register pair for also receiving and storing a copy of the binary number stored in the associated primary register, and said buffer register further being responsive to signals of a first and second kind, respectively, applied at the feedback input for incrementing and decrementing, respectively, the number stored in said buffer register;

first means coupling the output of each buffer register to the second input of the associated primary register for setting the number stored in said primary register to the value of the number in said associated buffer register;

second means coupling said output of said primary register in each pair to the first input of the associated buffer register;

third means for connecting the third input of each said buffer registers to said feedback signal input to provide to said third input externally applied feedback signals, said feedback signals being of either a first and second kind to increment and decrement, respectively, said buffer registers;

fourth means responsive to a flag bit at any of said flag bit inputs for providing a flag bit at said flag bit output of the neural processor;

fifth means for providing at said number output a number representing the average of the numbers stored in all said buffer registers of said register pairs.

2. The invention as defined in claim 1 wherein said fifth means, includes:

means for adding the numbers stored in said buffer registers to obtain a sum; and means for dividing the sum by a number equal to the number of register pairs to obtain an average number.

3. The invention as defined in claim 1 wherein said fifth means comprises:

add circuit means for adding the numbers stored in each of said buffer registers to provide a sum; and processor means for dividing said sum by a number equal to the number of register pairs to provide an average number.

4. The invention as defined in claim 2 wherein the number of register pairs comprises the number N and wherein said means for adding comprises a predetermined plurality of N-1 adder means.

5. The invention as defined in claim 3 wherein said fourth means comprises:

Or gate means; said Or gate means having multiple inputs and an output for providing an output responsive to an input applied to any of said multiple inputs; and means coupling said Or gate means inputs to respective ones of said flag bit inputs.

6. In an artificial neural system containing a plurality of digital artificial neural processors, the improvement wherein each of said digital artificial neural processors comprise:

a plurality of primary binary registers for receiving and storing binary numbers and a corresponding plurality of buffer registers, with one buffer register in said plurality being associated with a corresponding one of said primary registers; each said buffer registers being of the incrementing and decrementing type and being coupled to an associated primary register for initially receiving and storing a copy of the binary number contained in said associated primary register; means for applying a first type signal and a second type signal to each of said buffer registers to selectively increment or decrement the number stored in said buffer register responsive to said first type signal during the presence of said second type signal; means for resetting said primary registers subsequent to incrementing or decrementing the number stored in the associated buffer register; and means for processing the numbers stored in said buffer registers to provide at an output a number representing the average of the numbers stored in said plurality of buffer registers.

* * * * *